April 2, 1963     C. W. TITTLE ETAL     3,084,256
NEUTRON GENERATOR

Filed Sept. 3, 1957     2 Sheets-Sheet 1

INVENTORS
ALEXANDER THOMAS
CHARLES W. TITTLE

BY *Joseph Weingarten*
ATTORNEY

United States Patent Office 3,084,256
Patented Apr. 2, 1963

---

3,084,256
NEUTRON GENERATOR
Charles W. Tittle, Newtonville, and Alexander Thomas, Weston, Mass., assignors, by mesne assignments, to Laboratory for Electronics, Inc., Boston, Mass., a corporation of Delaware
Filed Sept. 3, 1957, Ser. No. 681,507
13 Claims. (Cl. 250—84.5)

The present invention relates in general to apparatus for producing neutrons and more particularly to a neutron generator tube providing a high neutron flux and adapted to operate in confined spaces, as for example within a cartridge capable of passing through the relatively small diameter bores encountered in neutron well logging.

Neutron generators of various types are extremely well known in the art. However neutron well logging imposes severe requirements. The apparatus must operate within a cartridge which might have an inner diameter of only three inches or less, and be subjected to extremes of temperature and shock. Power must be supplied from the surface of the earth which may be as much as twenty thousand feet removed from the cartridge, and in order to provide accurate data for geological analysis a high neutron output is required.

One type of generator which has been described in prior patents includes a discharge tube wherein ions are first created in a high voltage, low pressure gas discharge and thereafter accelerated into neutron producing collisions with a solid target coated with a hydrogen isotope. In this type of apparatus however a large proportion of the ions striking the target are diatomic and consequently each nucleus carries only one half the energy of the ion itself. Since the probability of producing a neutron varies strongly with the energy of the bombarding nucleus (for example, by a factor of fifteen in the LiT+D reaction between 30 and 60 kev.) there is considerable loss in neutron production because of diatomic ions.

Another type of neutron generating tube which has been described employs a radial electrode structure in which a heated coaxial filament emits electrons which, in turn, create deuterium or tritium ions in the gas. These ions are accelerated and bombard a solid target thereby producing neutrons. Neutron output of this type of tube is inherently limited however by the radial geometry, particularly because of breakdown problems introduced by the required high voltages.

The present invention contemplates and has as a primary object the provision of a highly efficient, simplified and relatively inexpensive neutron generator wherein thermionic electrons are accelerated to bombard a target electrode in a low pressure atmosphere of hydrogen isotope, thus producing deuterium or tritium ions, which in turn are accelerated into neutron producing collisions with a second target electrode.

It is another object of this invention to provide a neutron generator of increased efficiency wherein the electrodes are so arranged that ions may be formed by electron collision in the gas, while dynamic pressure equilibrium may be maintained at a pressure sufficiently low to prevent the formation of a substantial number of diatomic ions.

A further object of this invention is to provide a neutron generator utilizing novel axial geometry.

These and other objects of the present invention will now become apparent from the following detailed description of a preferred embodiment of the invention wherein.

Figure 1:
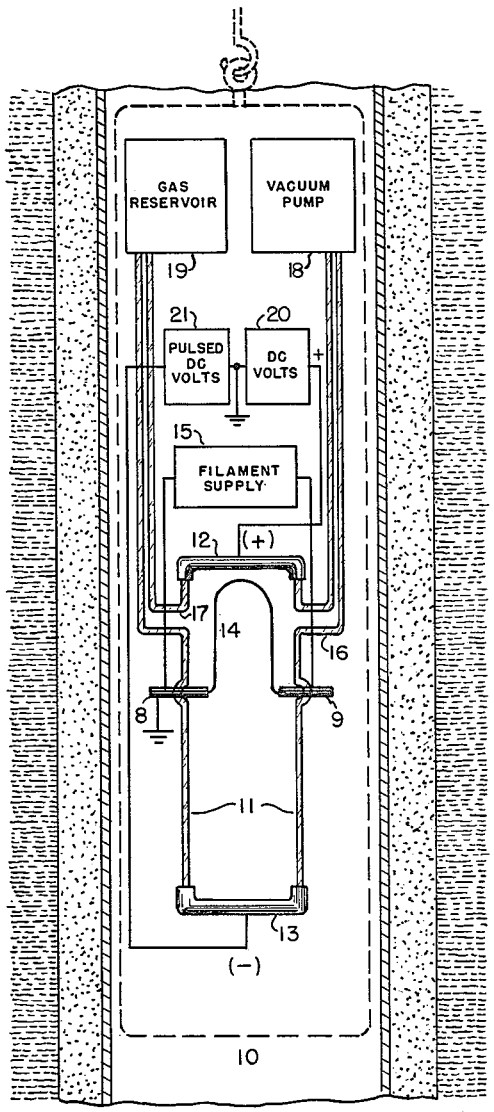
FIG. 1 is an illustration, partly in schematic form, of a neutron generator embodying the concepts of this invention.

With reference now to the drawing and more particularly to FIG. 1 thereof, the neutron generator of this invention is diagrammatically shown enclosed by a broken line 10 representing the general configuration of a well surveying tool within a typical oil well bore. The purpose of such illustration is generally to indicate the problem encountered in devising a neutron generator which includes gas accessories and power source within an axial container no more than three inches in inside diameter. While FIG. 1 discloses axial alignment of the various components within the limited space available, it is not intended that this view be an accurate scale drawing of either the tool or the casing, nor does it show the only practical arrangement of the components.

More specifically with reference to FIG. 1 the neutron generator tube is seen to comprise a generally cylindrical glass envelope 11 capped at both ends by axially spaced conductive metal electrode cups 12 and 13, hermetically sealed to the glass in the conventional manner.

A U-shaped filament electrode 14 of tungsten wire or other suitable thermionic electron emissive material is conductively supported upon metal rods 8 and 9 which are hermetically sealed in a conventional manner through the glass envelope. The arch of the U is preferably quite close to the inner surface of electrode 12. As shown, the opposed ends of filament 14 are connected to a filament power supply 15, and one end of filament 14 is grounded.

A pair of tubes 16 and 17 open into the interior of envelope 11 and furnish means for connecting a vacuum pump 18 and gas reservoir 19, respectively.

Electrodes 12 and 13 are preferably formed of Kovar which is particularly satisfactory since it is able to withstand the imposed extremes of temperature while being readily sealable to the glass envelope 11. Electrode 12 is connected to the positive side of D.C. voltage supply 20. Electrode 13 is connected to the negative terminal of a pulsed D.C. voltage supply 21.

Electrodes 12 and 13 may be coated on their inner surfaces with a substance containing a hydrogen isotope; hydrogen isotope meaning deuterium, tritium, or a mixture of deuterium and tritium. Suitable materials for the coating of either target electrode are lithium, titanium, or zirconium treated to contain such hydrogen isotope as aforementioned.

Figure 2:
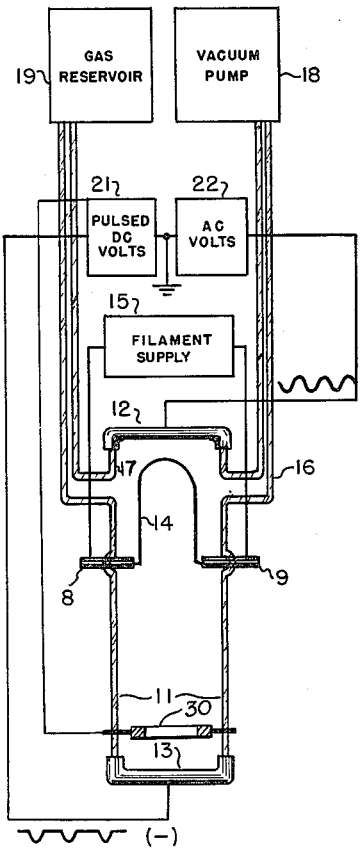
FIG. 2 is an illustration of an alternate mode of operation of the neutron generator disclosed in FIG. 1.

FIG. 2 diagrammatically illustrates an alternate mode of operation of the tube of FIG. 1, and in view of the similarity of structures, like reference numerals have been used to designate like components. In this arrangement electrode 12 is connected to an A.C. voltage supply 22 which operates out of phase with the pulsed D.C. supply 21; thus when electrode 12 is energized with maximum positive potential, electrode 13 is at its maximum negative value.

Having described the nature and interconnection of key elements of the neutron generator tube and alternate power application techniques, the modes of operation will now be discussed.

In both FIGS. 1 and 2, gas reservoir 19 and pump 18 are operated to maintain a continuing flow and supply of gas within envelope 11. The control valve arrangements for maintaining dynamic pressure equilibrium have not been illustrated as their details form no part of the present disclosure.

In FIG. 1, thermionic filament 14 is heated by current from filament supply 15 causing electrons to be emitted within the envelope 11. The positive potential, which may be between one hundred volts and a few kilovolts, is applied to target electrode 12 relative to filament 14 by D.C. supply 20, causing the emitted electrons to be accelerated toward target electrode 12. Deuterium or tritium ions or a combination thereof are thus formed, both by collision in the gas and by bombardment of the surface of target electrode 12, the latter having been conditioned by operation in an atmosphere of deuterium or tritium or a mixture thereof. These ions are axially accelerated past the filament towards target electrode 13 by the electric field created with the application of a negative potential of the order of 60 to 100 kilovolts to target 13 relative to electrode 12. If target electrode 13 is formed with a hydrogen isotope containing coating or surface, neutrons are produced by virtue of the D(d,n), D(t,n) and/or T(d,n) reactions.

The gas pressure is maintained by the pumping system at a value high enough to maintain and replenish the hydrogen isotope concentration on the target surfaces but low enough so that the probability of the monatomic ions combining into diatomic ions is kept to an acceptably low level. An acceptable gas pressure for the voltages specified is one micron. By avoiding the creation of diatomic ions where nuclei each have only one-half the total energy of the ion itself the number of neutrons produced is materially enhanced.

Figure 3:
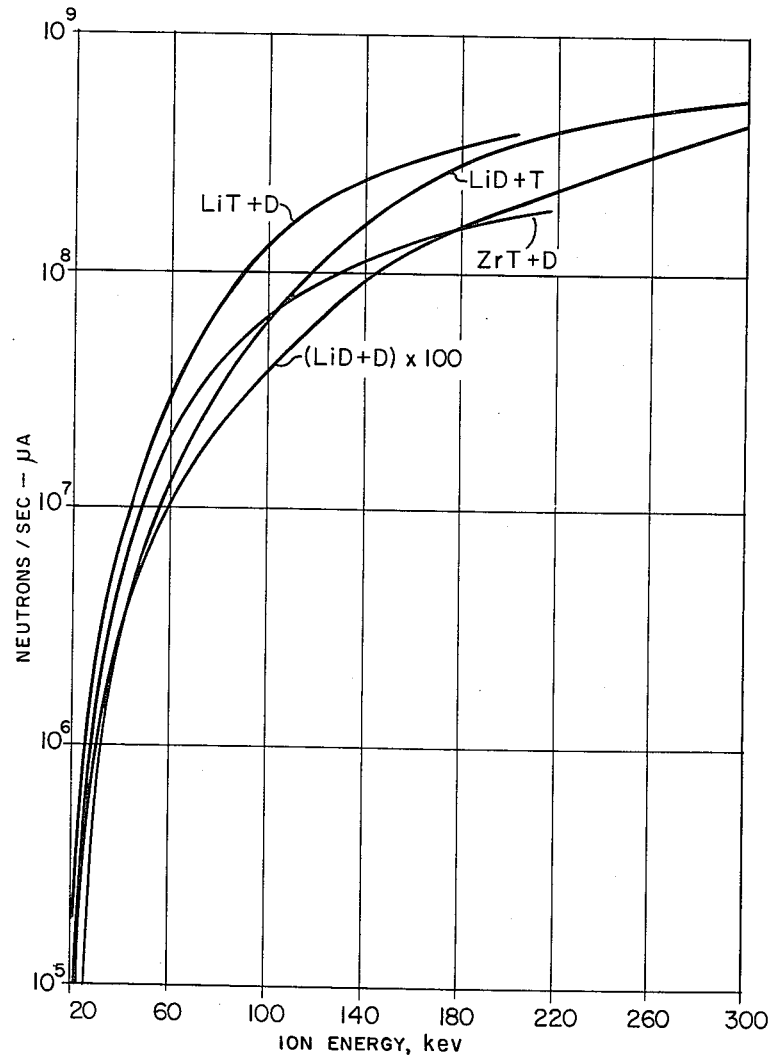
FIG. 3 is a graphical representation of neutron output as a function of ion energy for a multiplicity of neutron producing nuclear reactions.

As is indicated in FIG. 3, the neutron output increases steeply with increasing energy of the bombarding nucleus for all the reactions indicated. Considering, for example, the LiT+D output indicated in FIG. 3, and assuming an ion energy of 60 kev. the neutron yield from the bombardment by diatomic ions would be twice the yield obtained with 30 kev. monatomic ions or about $4 \times 10^6$ neutrons/sec/$\mu$a. However, monatomic ions at 60 kev. would produce $3 \times 10^7$ neutrons/sec/$\mu$a. Thus a pure monatomic ion bombardment at 60 kev. would produce approximately seven times the neutron flux that would be produced by diatomic ions for the same current.

The axial tube geometry disclosed herein is particularly advantageous since it allows an exceedingly large surface area for electron bombardment and also because it permits the highest possible voltage to be applied in a device of specified dimensions.

The hydrogen isotope atmosphere is maintained at dynamic equilibrium providing long term stability of the pressure and purity and thus providing a more nearly constant neutron output.

In the alternate mode of operation depicted in FIG. 2 target electrode 12 is connected to an A.C. voltage supply 22, and is therefore alternately positive and negative with respect to filament electrode 14. In this operation the phasing is such that the potential applied to electrode 12 is maximum positive when the pulsed D.C. on electrode 13 is at its greatest negative value. This mode of operation is preferred when pulsed D.C. is applied to electrode 13, since pure D.C. bombardment of electrode 12 is a useless waste of power during the time that the ion accelerating voltage is low or zero. Pure D.C. applied to electrode 12 is preferred when pure D.C. is applied to electrode 13.

If pulses of neutrons of extremely short duration are desired, it is particularly convenient to pulse the voltage applied to electrode 12. In this case, the accelerating voltage applied to electrode 13 need not be pulsed (although it may be if the pulsing is timed to coincide with the pulses at electrode 12).

It is advantageous to include another electrode 30 immediately in front of electrode 13 for the purpose of suppressing the emission of secondary electrons from the target. The additional electrode is operated at a somewhat lower potential than electrode 13. Suppression of secondary electron emission not only reduces power consumption in the high voltage circuit but also reduces the probability of an undesirable electrical discharge.

While the present invention has been described and illustrated in FIG. 1 for use in oil well survey equipment it should be apparent that its utility is not necessarily so limited. The high efficiency obtained in this tube is advantageous in any neutron generator application.

In view of the fact, therefore, that numerous modifications and departures may now be made by those skilled in this art, the invention herein is to be construed as limited only by the spirit and scope of the appended claims.

What is claimed is:

1. Apparatus for generating neutrons comprising first and second spaced electrodes and an intermediate source of thermionic electrons in an atmosphere of gaseous hydrogen isotope at low pressure, means for accelerating and directing electrons from said source along substantially straight line paths into ion producing collisions with said first electrode, and means for accelerating said ions across said electron source into neutron producing collisions with said second electrode.

2. Apparatus for generating neutrons comprising, a pair of axially spaced electrodes and an intermediate filamentary source of thermionic electrons in an atmosphere of gaseous hydrogen isotope at low pressure, means for accelerating and directing electrons from said source along substantially straight line paths axially in one direction into ion producing collisions with one of said electrodes, and means for accelerating said ions axially in the opposite direction across said filamentary source into neutron producing collisions with the other of said electrodes.

3. Apparatus for generating neutrons in accordance with claim 2, wherein said filamentary source of thermionic electrons is arched in the direction of said ion producing electrode.

4. Apparatus for generating neutrons comprising first and second axially spaced target electrodes in a gaseous hydrogen isotope atmosphere at low pressure, a thermionic electron emissive electrode intermediate said first and second electrodes, means for heating said electron emissive electrode for releasing electrons, means for applying a positive potential to said first target electrode relative to said thermionic emissive electrode to direct released electrons along substantially straight line paths for bombardment of said first target electrode to produce ions of said gaseous isotope in the region of and at the surface of said first target electrode, means for applying a relatively high negative potential to said second target electrode with respect to said first target electrode for accelerating said ions across said thermionic emissive electrode and into neutron producing collisions with said second target electrode.

5. Apparatus for generating neutrons in accordance with claim 4 wherein the surface of said second electrode subject to said accelerated ion bombardment includes a hydrogen ion containing substance.

6. Apparatus for generating neutrons in accordance with claim 4 wherein the surface of said first target electrode subject to said accelerated electron bombardment and the surface of said second electrode subject to said accelerated ion bombardment include a hydrogen ion containing substance.

7. Apparatus for generating neutrons in accordance with claim 4 wherein said hydrogen isotope atmosphere comprises at least one of the gases deuterium, tritium or a mixture of deuterium and tritium.

8. Apparatus for generating neutrons in accordance with claim 6 wherein said hydrogen isotope atmosphere comprises at least one of the gases deuterium, tritium or a mixture of deuterium and tritium, and wherein said substance on said surfaces of said electrodes includes ions of at least deuterium, tritium or a mixture of deuterium and tritium.

9. Apparatus for generating neutrons comprising a tube having a generally cylindrical envelope capped at its opposed ends by first and second conductive target electrodes, means supporting a filamentary thermionic electron emissive source transversely of said envelope in the region of said first target electrode, means including a source of gaseous ionizable hydrogen isotope and a pump communicating with the interior of said envelope for maintaining the inner surfaces of said target electrodes and said filamentary electron emissive source in a low pressure atmosphere of said gaseous ionizable hydrogen isotope in dynamic equilibrium, means for heating said filamentary source for the release of electrons, means for applying a positive potential to said first target electrode relative to said filamentary source to accelerate and direct said released electrons therefrom along substantially straight line paths into hydrogen isotope ion-producing collisions with said first electrode, means for applying a relatively high negative potential to said second target electrode with respect to said first target electrode for accelerating said hydrogen isotope ions generated in the region of said first target electrode axially across said filamentary source into neutron producing collisions with said second target electrode.

10. Apparatus for generating neutrons in accordance with claim 9 wherein said hydrogen isotope atmosphere comprises at least one of the gases deuterium, tritium, or a mixture of deuterium and tritium.

11. Apparatus for generating neutrons in accordance with claim 10 wherein the surface of said first and second target electrodes subject to electron and ion bombardment respectively are coated with a substance which includes ions of at least deuterium, tritium, or a mixture of deuterium and tritium.

12. Apparatus for generating neutrons in accordance with claim 9 and including means within said envelope adjacent said second target electrode for suppressing secondary electron emission therefrom.

13. Apparatus for generating neutrons in accordance with claim 9 wherein said relatively negative potential applied to said second target electrode is pulsed and wherein said relatively positive potential is applied to said first target electrode solely during periods of application of said negative potential to said second target electrode.

References Cited in the file of this patent

UNITED STATES PATENTS

| | | |
|---|---|---|
| 2,489,436 | Salisbury | Nov. 29, 1949 |
| 2,689,918 | Youmans | Sept. 21, 1954 |
| 2,712,081 | Fearon et al. | June 28, 1955 |
| 2,735,019 | Dewan et al. | Feb. 14, 1956 |
| 2,769,096 | Frey | Oct. 30, 1956 |
| 2,926,271 | Brinkerhoff et al. | Feb. 23, 1960 |